United States Patent [19]

Rieder

[11] Patent Number: 5,383,284
[45] Date of Patent: Jan. 24, 1995

[54] MEASURING CARRIAGE FOR A LINEAR MEASURING SYSTEM

[75] Inventor: Heinz Rieder, Oberndorf, Austria

[73] Assignee: RSF-Elektronik Gesellschaft m.b.H., Tarsdorf, Australia

[21] Appl. No.: 146,308

[22] Filed: Nov. 2, 1993

[30] Foreign Application Priority Data

Nov. 2, 1992 [AT] Austria ................... 2158/92

[51] Int. Cl.⁶ .................. G01B 11/00; H01J 5/16
[52] U.S. Cl. ....................... 33/706; 33/707; 33/DIG. 3; 250/237 G; 356/374
[58] Field of Search .............. 33/706, 703, 705, 707, 33/708, DIG. 3, DIG. 7; 250/578.1, 237 G; 356/374, 375, 395, 400, 401

[56] References Cited

U.S. PATENT DOCUMENTS

| | | | |
|---|---|---|---|
| 4,564,294 | 1/1986 | Ernst | 33/707 |
| 4,982,508 | 1/1991 | Nelle et al. | 33/707 |
| 5,115,573 | 5/1992 | Rieder et al. | 33/706 |
| 5,258,931 | 11/1993 | Hassler, Jr. | 33/707 |

Primary Examiner—William A. Cuchlinski, Jr.
Assistant Examiner—Christopher W. Fulton
Attorney, Agent, or Firm—Collard & Roe

[57] ABSTRACT

A measuring carriage for a linear measuring system comprises a measurement sensing entrainment block arranged outside a tubular protective housing defining an interior chamber and a slot sealed by sealing lips in one side thereof. The block comprises a tongue projecting into the interior housing chamber through the slot. Support parts for carrier plates in the interior housing chamber are connected to the entrainment block by the tongue, and the carrier plates hold terminals generating electrical signals derived from sensing a measuring scale by the entrainment block. A connecting cable is attached to, and leads from, the entrainment block, and wires connect the signal generating terminals to the connecting cable, the wires passing from the signal generating terminals to the entrainment block and the connecting cable through a recess in the tongue. The tongue comprises complementary halves which may be fitted together to define the recess therebetween.

5 Claims, 2 Drawing Sheets

MEASURING CARRIAGE FOR A LINEAR MEASURING SYSTEM

BACKGROUND OF THE INVENTION

1. Field of the Invention

The present invention relates to a measuring carriage for a linear measuring system which comprises a tubular protective housing having opposite sides, the tubular housing defining an interior chamber and one of the housing sides defining a slot sealed by sealing lips, and a measuring rod carrying a measuring scale arranged in the interior housing chamber. The measuring carriage comprises a measurement sensing entrainment block arranged outside the housing adjacent the one housing side, the block comprising a tongue projecting into the interior housing chamber through the slot, means for generating electrical signals derived from sensing the measuring scale by the entrainment block, carrier means in the interior housing chamber for supporting the signal generating means, support means for the carrier means, the tongue connecting the entrainment block to the support means, a connecting cable attached to, and leading from, the entrainment block, and wires connecting the signal generating means to the connecting cable, the wires passing from the signal generating means to the entrainment block and the connecting cable through a recess in the tongue.

2. Description of the Prior Art

Measuring carriages of this type may be used in connection with various measuring systems, including an absolute measuring scale, an incremental measuring scale or a combination thereof, especially systems in which reference and/or control marks are provided on a measuring rod in addition to an incremental measuring scale, and wherein the scale and marks are sensed according to the selected measuring system by well known generally opto-electronic, particularly photoelectric, capacitative, inductive or magnetic sensing principles. For this purpose, suitable devices are mounted on one or more carriers for generating measuring and/or position-indicating electric signals. Opto-electronic sensing devices usually include illuminating elements which illuminate the scale and photo-receivers, combined with sensing grids in the case of incremental scales, which sense the point on the scale on which they are focussed and generate corresponding read-out signals. The illuminating elements are usually mounted on a plate or like carrier means. The measuring carriage may be guided on the measuring rod for displacement therealong and it is known to arrange the measuring rod in a tubular protective housing, and the sensing or read-out units may be adjustably connected to the measuring carriage and also guided on the measuring rod. Particularly if the carrier means are plates, they may also carry signal shaping means or amplifying stages, in addition to the illuminating and sensing elements.

Regardless of the sensing and read-out system, the carrier means must hold a multiplicity of terminals for the power supply to the illuminating devices, the input of control signals and particularly the output of the measuring signals for transmission to processing, counting and control devices, each terminal having an individual transmission wire connected thereto. Heretofore, the wires were led through a recess in the tongue of the measuring carriage and connected to a connecting plate, and corresponding end wires of the connecting cable were associated with the transmission wires and soldered thereto. The cable is attached to a bore in the entrainment block and the wires are passed through the bore and are soldered to the connecting plate outside the block. Subsequently, the connecting plate is introduced in a recess in the entrainment block. The need for a connecting plate and the proper association of the cable wires with the transmission wires considerably increases the time and skill required for assembling the measuring carriage. When the connecting plate is introduced in the entrainment block, usually through a bottom slot therein, the danger exists that the wires are mixed up and/or damaged. In addition, the connecting plate and the wires leading therefrom to the carrier plates increase the weight of the measuring carriage.

SUMMARY OF THE INVENTION

It is the primary object of this invention to provide a measuring carriage of the first-described type in which the connection of the signal transmission wires to the cable outside the carriage is greatly simplified, and in which it also is much simpler than heretofore to replace the carrier means for the signal generating means and the signal generating means themselves.

The above and other objects are accomplished in such a measuring carriage with a tongue comprising complementary halves which may be fitted together to define the recess therebetween.

In this arrangement, it is possible to do away with the heretofore absolutely necessary intermediate plate used purely as a connecting plate, the cable wires being led directly to the carrier means for the signal generating means. Even if a plate is used for carrying a portion of the electrical means, such as amplifying or other signal shaping devices, assembling of the measuring carriage is facilitated because the wires may be soldered to the terminals at their desired length outside the carriage and then inserted in their proper order in the carriage.

In the illustrated embodiment, the carrier means comprises at least one plate and the signal generating means comprises electrical terminals thereon, and one of the complementary halves is a recessed plate mounted on the entrainment block.

According to a preferred feature of the invention, the measuring carriage comprises a base and a complementary cover, the support means being mounted on the base, the base defining an open through passage in communication with the recess in the tongue and a bore, the wires leading from the recess, through the through passage and the bore to the connecting cable, and the cover closing the recess and through passage. In this way, the end of the cable may be inserted in the bore and the wires and intermediate carrier plate, if used, may be placed in the readily accessible open through passages in the base. It is then quite easy to place the wired plates in the interior of the protective housing and to mount them on the support means therein. The wires lead directly from the signal generating means through the recess, the through passage and the bore to an end of the cable, and the housing interior is fully covered and protected by the cover and sealed by the sealing lips. Since the entire lengths of the wires are readily accessible, they may be readily ordered without intersecting each other during assembly.

BRIEF DESCRIPTION OF THE DRAWING

The above and other objects, advantages and features of the present invention will become more apparent from the following detailed description of a now preferred embodiment thereof, taken in conjunction with the accompanying, partly schematic drawing wherein.

DETAILED DESCRIPTION OF THE PREFERRED EMBODIMENT

Figure 1:
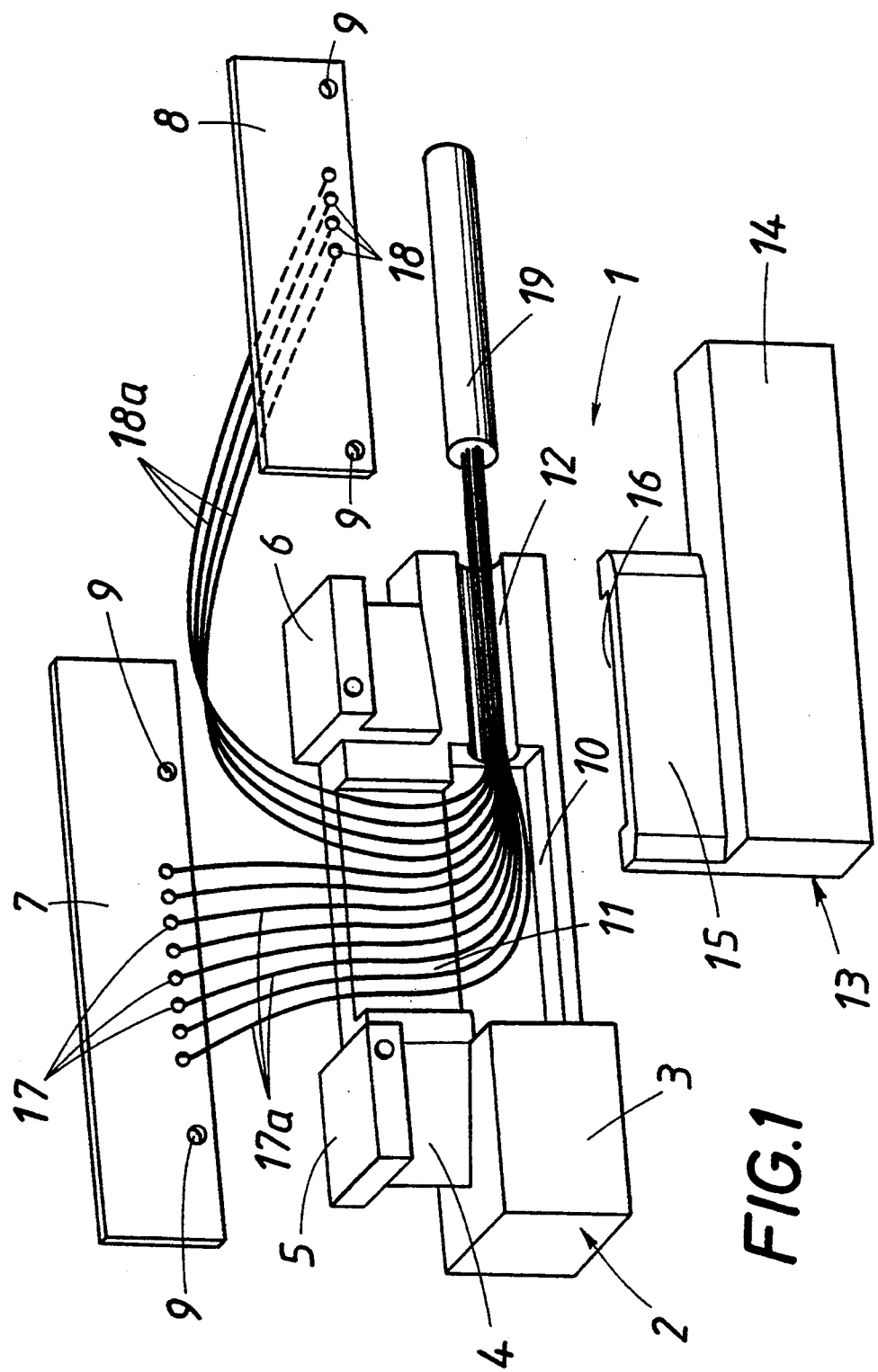
FIG. 1 is an exploded perspective view of a measuring carriage according to this invention.

The drawing illustrates measuring carriage 1 for a linear measuring system although the carriage may be used with other measuring systems. The illustrated measuring system is encased in tubular protective housing 20 defining an interior chamber and one of the housing sides, i.e. the bottom, defines slot 23 sealed by sealing lips 22. Measuring rod 21 carries incremental measuring scale 24.

Measuring carriage 1 comprises a measurement sensing entrainment block arranged outside housing 20 adjacent the one housing side, the block comprising tongue 4 projecting into the interior housing chamber through slot 23. In the illustrated embodiment, the measuring carriage comprises base 2 which has a main part 3 forming the measurement sensing entrainment block and complementary cover 13 consisting of lower cover part 14 and upper cover part 15. The lower cover part is complementary to main part 3 to provide a covering unit and the upper cover part is complementary to tongue 4, cover parts 14, 15 defining recesses 16 complementary to laterally open recesses 10, 11, 12. Recesses 10, 12 are provided in main part 3 and recess 11 is provided in tongue 4.

Support parts 5, 6 for carrier plates 7, 8 are mounted on the base, and the carrier plates hold means for generating electrical signals derived from sensing measuring scale 24 by the entrainment block, as it is guided therealong. The signal generating means are illustrated by terminals 17 on carrier plate 7 and terminals 18 on carrier plate 8, carrier plate 7 carrying photoelectric receivers 26 and carrier plate 8 carrying illuminating devices 25. Terminals 18 may be, for example, power supply terminals for illuminating devices 25 on carrier plate 8 while four associated terminals 17 on carrier plate 7 are provided for photoelectric receivers 26 which are illuminated by the illuminating devices and generate electric measuring signals when the entrainment block is displaced relative to the measuring rod.

The carrier plates have bores 9 receiving screws (not shown) attaching the carrier plates to support parts 5, 6. Base 2 defines open through passage 10 in communication with recess 11, 16 in tongue 4 and bore 12, recess 10 and bore 12 being provided in main part 3. Tongue 4 connects the entrainment block to support parts 5, 6, and connecting cable 19 is attached to, and leads from, the entrainment block of the measuring carriage. Cable wires 17a, 18a connect terminals 17, 18 to the connecting cable and the wires pass from the terminals to the entrainment block and connecting cable 19 through recess 11, 16 in the tongue, leading from the recess, through through passage 10 and bore 12 to connecting cable 19. Bore 12 defines a closed shaft holding the wires and cover 13 closing the recess and through passage.

According to the invention and as clearly shown in the drawing, tongue 4 is comprised of complementary halves which may be fitted together to define recess 11, 16, one half of the recess being defined in tongue 4 and the other half of the recess being defined in upper cover part 15, which is a recessed plate mounted on the entrainment block.

Each terminal 17, 18 is connected to an associated wire 17a, 18a of common connecting cable 19. The connections, for example by soldering, may be made outside measuring carriage 1, after which the wires are placed in bore 12 of cover 13 and lead through through passage 10 and half recess 11, whereon the cover is plugged onto the entrainment block. After carrier plates 7, 8 are screwed to support parts 5, 6, the measuring carriage is ready for operation.

Figure 2:
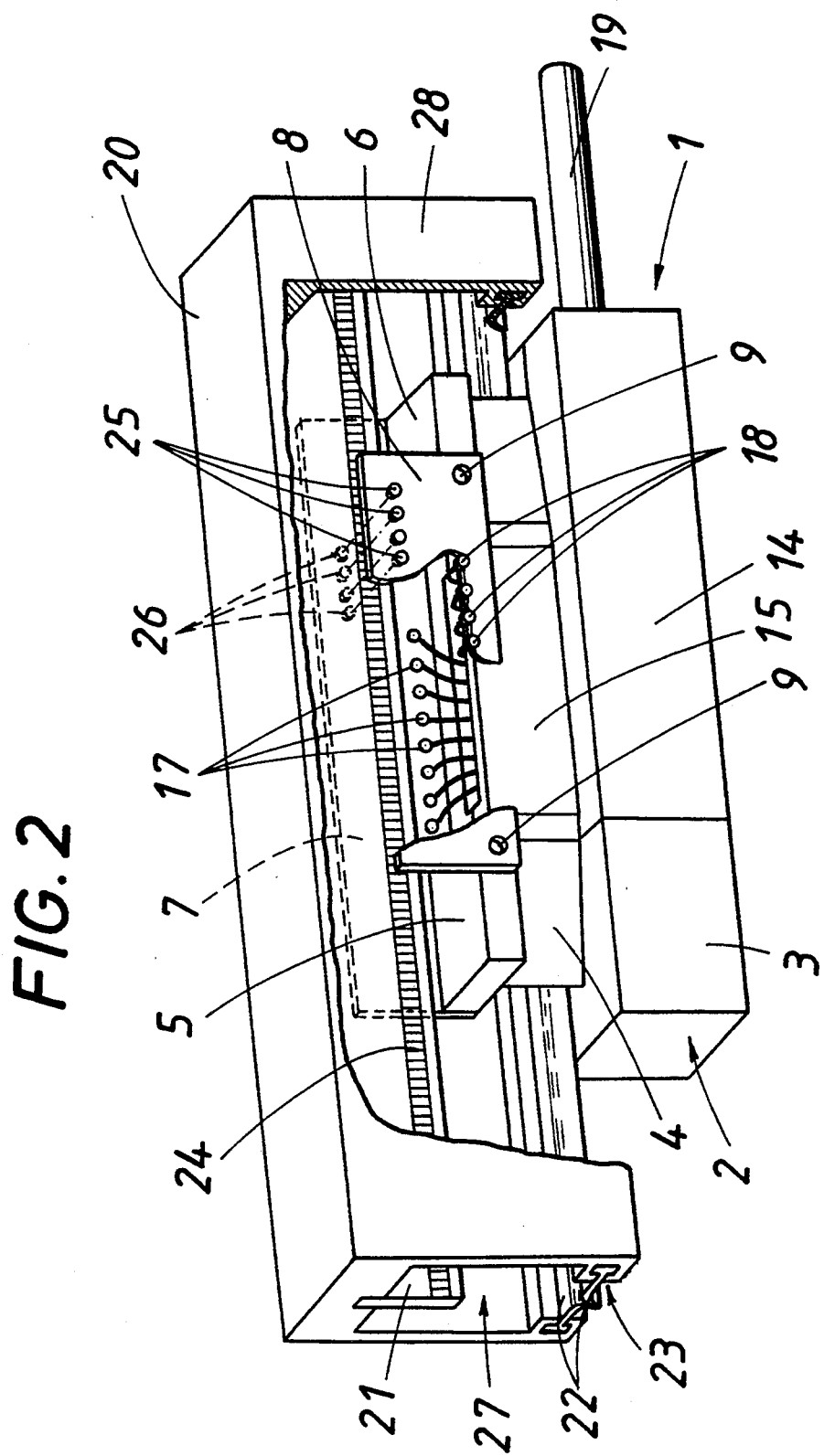
FIG. 2 is a perspective view showing the assembled measuring carriage, with a front wall of the protective housing and one of the carrier plates broken away to show the interior containing the measuring system.

FIG. 2 shows the assembled carriage, illustrating the projection of tongue 4 and its complementary part 15 through slot 23 into interior chamber 27 of tubular protective housing 20 between sealing lips 22. Carrier plate 7 is arranged behind measuring rod 21 and carrier plate 8 in front thereof.

In the embodiment illustrated in FIG. 2, the emplacement of tongue 4, 15, with carrier plates 7, 8 attached to support parts 5, 6, in interior chamber 27 of tubular protective housing 20 is effected from one end of the housing, which is then closed by a suitable cover. If desired, the front side of housing 20 may be constituted by a removable cover, in which case the emplacement may be effected through the front side after the cover is removed, and the cover is placed on again after the emplacement.

If an intermediate connecting plate is used, in addition to the two carrier plates, it is inserted in recesses 10, 11, 16 during assembly. The recesses 10, 11 may have insertion supports for such an intermediate connecting plate or such a plate may be shaped in part to conform to the shape of the recess so that it will be held in position upon insertion. At least some of the wires are then led to intermediate terminals on the intermediate connecting plate which has terminals connecting it to connecting cable 19.

What I claim is:

1. A measuring carriage for a linear measuring system which comprises a tubular protective housing having opposite sides, the tubular housing defining an interior chamber and one of the housing sides defining a slot sealed by sealing lips, and a measuring rod carrying a measuring scale arranged in the interior housing chamber, the measuring carriage comprising
    (a) a measurement sensing entrainment block arranged outside the housing adjacent the one housing side, the block comprising
        (1) a tongue projecting into the interior housing chamber through the slot,
    (b) means for generating electrical signals derived from sensing the measuring scale by the entrainment block,
    (c) carrier means in the interior housing chamber for supporting the signal generating means,
    (d) support means for the carrier means,
        (1) the tongue connecting the entrainment block to the support means,
    (e) a connecting cable attached to, and leading from, the entrainment block, and
    (f) wires connecting the signal generating means to the connecting cable,
        (1) the wires passing from the signal generating means to the entrainment block and the connecting cable through a recess in the tongue, and (2) the tongue comprising complementary halves which may be fitted together to define the recess therebetween.

2. The measuring carriage of claim 1, wherein the carrier means comprises at least one plate and the signal generating means comprises electrical terminals thereon.

3. The measuring carriage of claim 1, wherein one of the complementary halves is a recessed plate mounted on the entrainment block.

4. The measuring carriage of claim 1, comprising a base and a complementary cover, the support means being mounted on the base, the base defining an open through passage in communication with the recess in the tongue and a bore, the wires leading from the recess, through the through passage and the bore to the connecting cable, and the cover closing the recess and through passage.

5. The measuring carriage of claim 4, wherein the wires lead directly from the signal generating means through the recess, the through passage and the bore to an end of the cable.

* * * * *